Sept. 20, 1960   R. W. HALBERG ET AL   2,953,213
BEARING POSITIONING MECHANISM FOR PROPELLER SHAFT
Filed Dec. 10, 1956   2 Sheets-Sheet 1

Inventors:
Robert W. Halberg
and Roger S. Hutton
By: Keith J. Bleuer  Atty.

Sept. 20, 1960   R. W. HALBERG ET AL   2,953,213
BEARING POSITIONING MECHANISM FOR PROPELLER SHAFT
Filed Dec. 10, 1956   2 Sheets-Sheet 2

Inventors:
Robert W. Halberg
and Roger S. Hutton
By: Keith J. Blew Atty.

United States Patent Office
2,953,213
Patented Sept. 20, 1960

2,953,213

BEARING POSITIONING MECHANISM FOR PROPELLER SHAFT

Robert W. Halberg, Des Plaines, and Roger S. Hutton, Wheaton, Ill., assignors to Borg-Warner Corporation, Chicago, Ill., a corporation of Illinois Filed Dec. 10, 1956, Ser. No. 627,297

23 Claims. (Cl. 180—70)

Our invention relates to bearings for the drive or propeller shafts of automotive vehicles.

In an automotive vehicle employing three or more universal joints in its drive shaft assembly, with two propeller shaft sections connected by means of a center universal joint and with other universal joints positioned at the ends of the shaft sections and with a bearing for one of the shaft sections adjacent the center universal joint, difficulties are encountered in keeping the drive shaft assembly running smoothly when changes in angles occur at the universal joints, such as when high torque is transmitted through the drive shaft assembly causing the rear axle housing to turn so as to move the protuberant forward portion of the differential upwardly and thus wind up on the rear vehicle springs thereby changing the angles at least at two of the universal joints. Such a rotation of the rear axle housing occurs also, but in the reverse direction when the brakes are applied on the vehicle or the vehicle is driven in reverse resulting in further angular deviations in the above-mentioned universal joints. It should be noted here that secondary couple bending moments exist in the drive shaft assembly when in operation, which may cause vibration or roughness with angle changes and torque changes at the universal joints under the conditions mentioned; this is so because these secondary couple bending moments produce forces acting on the bearing. These secondary couple bending moments are those in the propeller shaft assembly due to the angles made at the universal joints, and these introduce forces comprising static and dynamic or vibratory components, and the vibratory components are objectionable particularly at the bearing. These couples are developed essentially because of the shapes and motions of the parts of the universal joints when operating at an angle. These secondary couple bending moments at each yoke are a maximum when the yokes of the universal joints are at right angles to the plane containing the two shaft sections. Under the different conditions mentioned above, the shaft sections remain substantially in line looking from either the top or bottom of the vehicle, and the plane of the shaft sections just mentioned thus is a vertical plane.

The vector sum of the static components existing at the bearing due to the secondary couple bending moments may be called a resultant static force and is hereinafter so referred to, and this resultant static force acts substantially horizontally and in a direction right or left dependent on the torque and joint angles. The vector sum of the dynamic components existing at the bearing due to the secondary couple bending moments may be called a resultant dynamic force and is hereinafter so referred to.

In constructing a vehicle employing three universal joints connecting two drive shaft sections in the drive shaft assembly, effort is made to keep in line as much as possible the drive shaft sections, commensurate with the other problems encountered in the construction of the vehicle. In a drive shaft assembly of this type, a bearing for one of these drive shaft sections is carried by a frame cross member or other support means to support the drive shaft assembly. However, a rigidly attached bearing does not operate satisfactorily to prevent drive shaft vibration when the drive shaft alignment is interfered with to too great an extent, as occurs when the rear axle housing winds up either forwardly or reversely as mentioned above.

Bearings for supporting the drive shaft assembly intermediate its length with cushioned mountings, using rubber, for example, are currently being used; their primary function being that of isolating the vibrations as much as possible from the frame and body of the vehicle.

It is an object of our invention to provide an improved bearing support for a central portion of the drive shaft assembly which not only will take the reaction of the drive shaft assembly from these resultant static and dynamic forces with respect to the frame of the vehicles but will also automatically position the bearing so that the resultant dynamic force which is vibratory is minimized for the various conditions of operation of the vehcile.

We have found that usually as the resultant dynamic force increases, there is a corresponding increase in the resultant horizontal static force at the bearing for the drive shaft assembly, and it is an object also to so construct the support mechanism for the bearing that the resultant static force will cause the automatic positioning of the bearing.

Assuming that there is no substantial angularity between the propeller shaft sections as seen from either the bottom or top of the vehicle chassis, as is true with conventional vehicle drive shaft assemblies, we have found that the center bearing should be lowered from the best normal drive position as the differential rotates upwardly with increased driving torque to the rear vehicle driving wheels in order to minimize the resultant dynamic force on the drive shaft bearing, and it is, accordingly, an object of the invention to provide a bearing support mechanism for the drive shaft assembly which will automatically lower the bearing of the drive shaft assembly as the resultant horizontal static force on the bearing increases.

It is a more particular object to provide a bearing support mechanism for the drive shaft assembly comprising a lever swingably mounted on a part fixed with respect to the vehicle frame or body so that the resultant horizontal static force mentioned above will cause the lever to swing and lower the bearing for the drive shaft assembly as the resultant horizontal static force increases, with little or no substantial change sidewise of the bearing.

Another object of this invention is to provide a yieldable mechanism in connection with the drive shaft assembly bearing which provides two stages of yielding, an initial relatively weak yielding stage being effective to support the weight of the drive shaft assembly and also being effective for transmission of relatively small torques through the drive shaft assembly and the second relatively hard yielding effect being effective for transmission of large torque through the drive shaft assembly.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

Figure 2:
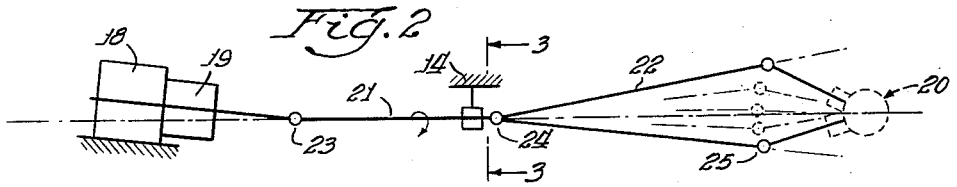
Fig. 2 is a side diagrammatic view of the drive shaft assembly showing the extremes of movement of certain parts of it under the influence of vehicle driving torque and vehicle braking torque.
Figure 3:
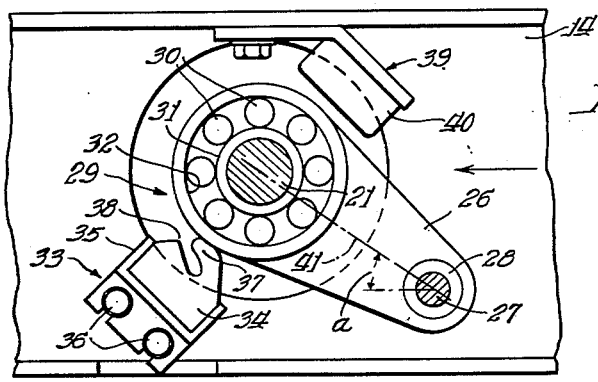

Fig. 3 is an enlarged sectional view on a plane indicated by line 3—3 in Figure 2 of the novel bearing support mechanism of the present invention; and Figs. 4, 5, 6 and 7 are enlarged sectional views on a plane indicated by line 3—3 in Figure 2 of alternate novel bearing support mechanisms of the present invention.

Like characters of reference designate like parts in the several views.

Figure 1:
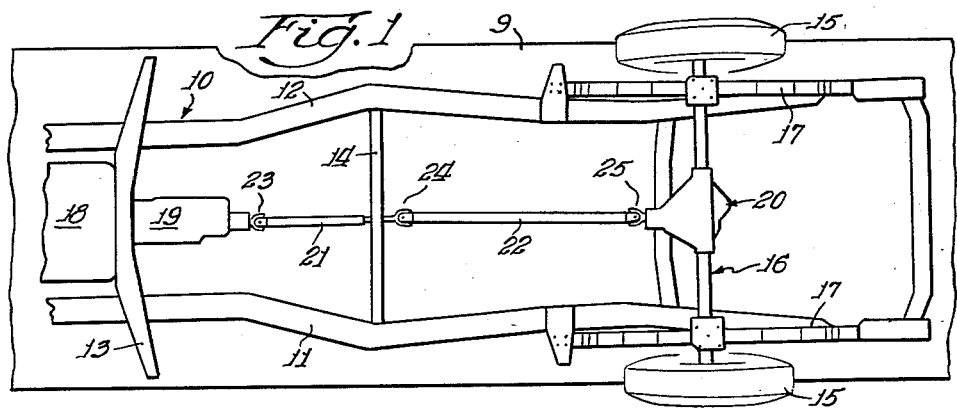
Fig. 1 is a bottom view of the major portion of a vehicle chassis showing the drive shaft assembly connected to the transmission at one end and to the differential at the other end.

Referring now to the drawings, in Fig. 1 there is illustrated a conventional automobile with a body 9 mounted on a frame 10 comprising two side frame members 11 and 12. The frame members 11 and 12 are connected together by a plurality of cross frame members including the cross frame members 13 and 14. The rear driving wheels 15 of the vehicle mounted on the rear axle assembly 16 are supported with respect to the frame 10 by means of rear springs 17 fixed with respect to the side frame members 11 and 12.

The usual vehicle engine 18 is mounted on the front end of the frame 10 and has a conventional transmission 19 connected thereto. The axle assembly 16 comprises the usual differential 20, and drive shaft sections 21 and 22 are utilized for providing a driving connection between the transmission 19 and the differential 20. Universal joints 23, 24 and 25 are provided respectively between the transmission 19 and the drive shaft section 21; between the sections 21 and 22, and between the section 22 and the differential 20.

The drive shaft section 21 is swingably mounted with respect to the cross member 14 by means of a bearing support mechanism comprising a lever 26 which is swingably mounted by a pivot 27 to the cross frame member 14. The pivot 27 may be provided with a rubber grommet 28 if desired. The lever 26 carries a bearing 29 which comprises a plurality of balls 30 disposed between an inner race 31 and an outer race 32. The drive shaft section 21 extends through the inner race 31, and the outer race 32 is disposed within the lever 26.

A two-stage yieldable stop member 33 is mounted on the cross frame member 14 and comprises a body 34 of rubber-like material disposed in a supporting shell 35 fixed to the cross frame member 14 by means of studs 36. The body 34 comprises a lip 37 adapted to make contact with the lever 26 to support an initial load on the bearing 29 and an outwardly extending projection 38 also adapted to make contact with the lever 26 when the lever 26 is swung about the pivot 27 in a counterclockwise direction, as viewed in Figure 3, further compressing the lip 37.

An upper bumper 39 is mounted on the cross frame member 14 to limit the clockwise movement, as viewed in Figure 3; that the lever 26 may make about its pivot 27. The bumper 39 may comprise a block of rubber 40 and may be mounted with respect to the cross frame member 14 by any suitable means. Attention is called to the fact that the bearing mechanism or any part thereof is not necessarily limited to the cross frame member as support means for attachment.

It will be noted that, for purposes to be hereinafter described, the center line 41 of the lever 26 through the center of the shaft 21 and the pivot 27 extends at an angle $a$ with respect to horizontal. This angle may vary for different installations; however, we have found that it is preferably quite small—in actual installations, angles between 15° and 35° have been found suitable. The angle is small in order that there is a relatively large vertical movement of the bearing 29 with relatively insubstantial horizontal movement of the bearing, as the lever 26 is swung about its pivot 27.

In the operation of the vehicle, when the vehicle is initially started, the torque on or tendency of the rear axle assembly 16 to rotate in a clockwise direction as seen in Figure 2 in driving the vehicle through the rear wheels 15, is impressed on the frame 11 through the rear springs 17. This winding up of the rear axle on the rear springs 17 is roughly in proportion to the torque being transmitted and changes the angles of the universal joints 24 and 25 or more particularly the angles between the drive shaft sections roughly in proportion to the amount of said wind up as may be seen by referring to Figure 2. It should be pointed out, however, that other factors will cause a change in the angles of said universal joints 24 and 25 or more particularly the angles between the drive shaft sections, such as, variation in the load carried by the vehicle and the deflection of the springs when the vehicle hits uneven spots in the road during its operation. It should be further pointed out that vehicles of different makes have different universal joint angles in the drive shaft assembly under static conditions and other differences in connection with the arrangement of the various parts which constitute the completed vehicle as a product.

We have found that the bearing has a combination of resultant static and dynamic forces on it when the vehicle is driven. The resultant static force on the bearing is in the horizontal direction from right to left as seen in Figure 3, assuming that the drive shaft assembly is rotating in the direction indicated by the arrow in Figure 2, and increases with the torque transmitted from the engine 18 through the drive shaft assembly to the rear axle assembly 16 and increases also as the angle at the universal joint 25 changes due to wind up. The resultant dynamic force at the bearing increases generally in accordance with these two factors also; namely, in accordance with increased torque and changed angularity at each of the universal joints 23, 24 and 25. However, the dynamic components due to the secondary couple bending moments will tend to balance each other out if they oppose each other at different points along the drive shaft assembly, and this would occur if the bearing were moved to an optimum position for the various operating conditions of the drive shaft assembly to thus reduce the magnitude of the resultant dynamic force to a minimum for smoother operation under those conditions as hereinafter more fully described.

We have found that, when driving the vehicle, the dynamic components which tend to vibrate the drive shaft section 21 and the associated section 22 may be balanced out against each other by lowering the bearing 29 as the windup of the rear axle assembly increases and this results in a comparatively smooth operating drive shaft assembly. The lever 26 is thus set at an angle with respect to horizontal. With the lever 26 positioned at an angle, between 15° and 35°, for example, the resultant horizontal static force on the bearing tends to move the bearing 29 downwardly about the pivot 27 when the car is driven. The greater the resultant static force from right to left in Figure 3 is, the farther the lever 26 will be moved downwardly. This counterclockwise movement of the lever 26 about its pivot 27 is resisted by the two-stage stop member 33. The lip 37 functions principally to support the weight of the middle portion of the drive shaft assembly, and the resultant force in the counterclockwise direction on the lever 26 due to the static horizontal force is taken mostly by the projection 38 of the bumper of the stop 33. The stop 33 being yieldable, allows additional swinging movement and consequently, downward movement of the bearing 29 in proportion to the resultant horizontal static force on the bearing 29.

In the event that the brakes of the vehicle are applied, the rear axle assembly 16 tends to swing counterclockwise as seen in Fig. 2, in the direction opposite that mentioned for a drive of the vehicle from the engine, and furthermore, there is transmission of torque from the rear axle assembly 16 through the drive shaft assembly back to the engine 18, and therefore, the resultant static force on the bearing is from left to right as seen in Fig. 3, tending to swing the lever 26 clockwise about the pivot 27. The rubber stop 39 is provided for cushioning and stopping such clockwise movement of the lever 26 under such vehicle braking conditions at a point so as to locate the bearing at a position most compatible for smooth operation of the drive shaft assembly under those conditions.

Figure 4:
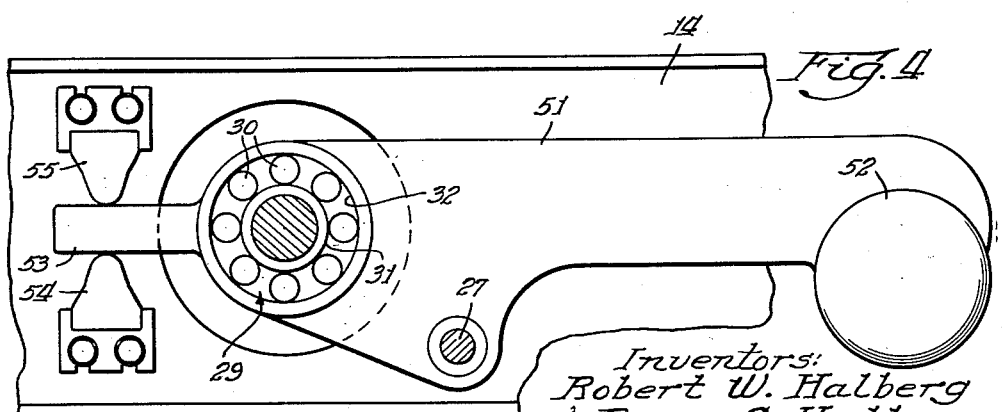

The second embodiment of the bearing support mechanism shown in Fig. 4 comprises a lever 51 swingably mounted with respect to the cross frame member 14 by means of a pivot 27. The lever 51 has a counterweight 52 fixed thereon for purposes to be hereinafter described. The lever 51 carries a bearing 29 opposite the counterweight 52 with respect to the pivot 27. The lever 51 carries a stop arm 53 extending outwardly from the bearing 29. Mounted on the cross frame member 14 on each side of the arm 53 are two stop members 54 and 55, preferably made of rubber, for the purpose of limiting the movement of the lever 51 about its pivot 27, and since the lever carries the bearing 29, it thus limits the movement of the bearing 29. In operation, this second embodiment of the bearing support mechanism shown in Fig. 4 is generally the same as the first embodiment of this invention shown in Fig. 3. However, the means employed in accomplishing the same results are somewhat different; for example, the counterweight 52 is for the purpose of supporting the weight of the medial portion of the drive shaft assembly and hence takes over the function of the lip 37 of the first embodiment of this invention. The stop 54 takes over the function of the projection 38 in the first embodiment of this invention. Keeping these facts in mind, it readily can be seen from the drawings that the bearing movements under the changing conditions pointed out above would respond to those changed conditions in approximately the same manner as in the bearing in the first embodiment of this invention shown in Fig. 3.

Figure 5:
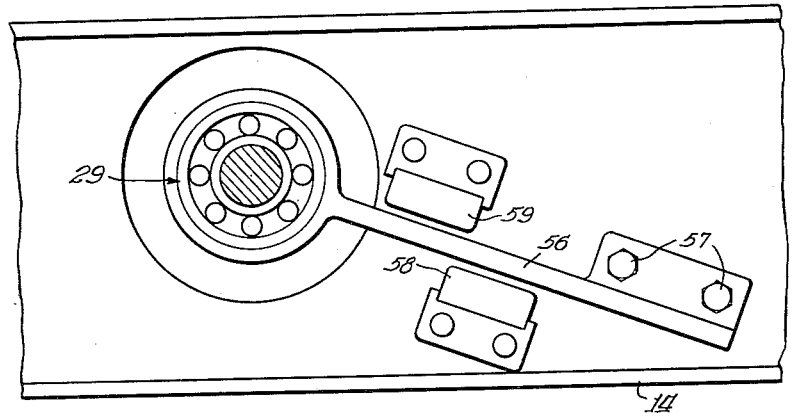

The third embodiment of the bearing support mechanism shown in Fig. 5 comprises a flexible lever 56, mounted with respect to the cross frame member 14 by means of studs 57. The flexibility of the lever 56 yieldably supports the weight of the medial portion of the drive shaft assemly and hence takes over the function of the lip 37 of the first embodiment of the bearing support mechanism as shown in Fig. 3. The lever 56 carries a bearing 29 as shown in the drawing, and, also mounted on either side of the flexible lever 56, there are two stop members 58 and 59. The stop member 58 limits the downward movement of the flexible lever 56, and the stop member 59 limits the upward movement of the flexible lever 58. These stop members respectively take over the function of projection 38 and upper bumper 39 of the first embodiment of the bearing support mechanism. Again keeping these facts in mind, it readily can be seen from the drawings that the bearing movements under the changing conditions pointed out above would respond to those changing conditions in approximately the same manner as for the bearing in the first embodiment of the bearing support mechanism shown in Fig. 3.

Figure 6:
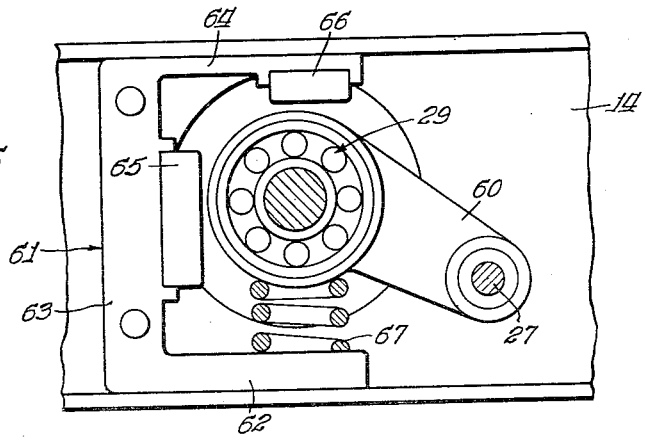

The fourth embodiment of the bearing support shown in Fig. 6 mechanism comprises a lever 60 swingably mounted with respect to the cross frame member 14 by means of a pivot 27. The lever 60 also carries a bearing 29 at the end opposite the pivot 27. Mounted on the cross frame member 14 opposite the bearing 29 with respect to the pivot 27, there is a U-shaped frame 61 which partially encompasses the bearing 29 and comprises three sides 62, 63 and 64. The side 62 carries a spring stop member 67 upon which the bearing 29 rests and which supports the weight of the medial portion of the drive shaft assembly, performing the function of the lip 37 in the first embodiment of this invention as shown in Fig. 3. The side 63 carries a yieldable stop member 65 of rubber-like material which takes over the function of the projection 38 in the first embodiment of the invention. The side 64 carries a yieldable stop member 66 which takes over the function of the upper bumper 39 of the first embodiment of the invention. Hence, it is apparent, that in function, this embodiment of the invention is similar to the first embodiment of the invention shown in Fig. 3.

Figure 7:
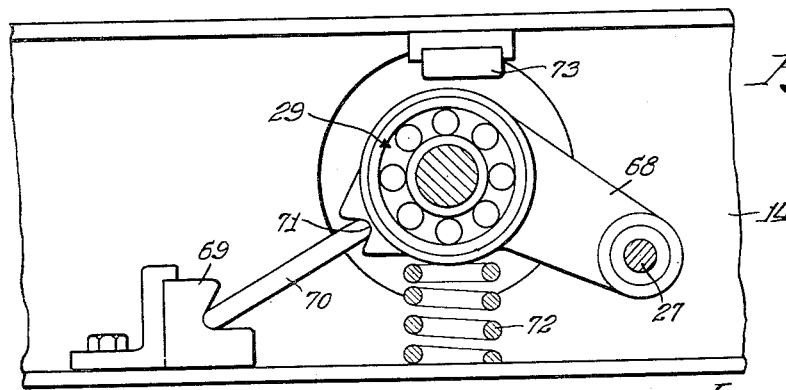

The fifth embodiment of the bearing support mechanism as shown in Fig. 7 comprises a lever 68 swingably mounted with respect to the cross frame member 14 by means of a pivot 27. The lever 68 also carries a bearing 29 at the end opposite the pivot 27. Mounted on the cross frame member 14 opposite the bearing 29 with respect to the pivot 27 is a yieldable support member 69 of rubber-like material having associated therewith a strut 70 which fits in a notch 71 at the end of the lever 68. Also mounted on the cross frame member, there is a lower spring stop member 72 and an upper rubber-like stop member 73 which respectively limit the swing of the lever 68 on the pivot 27 in a downward and upward direction. Here again it can be seen that, in function, this embodiment of the invention is the same as the first embodiment of the invention as shown in Fig. 3. The weight of the medial portion of the drive shaft assembly is supported by the spring stop member 72 which functions similarly to the lip 37 in the first embodiment. The yieldable stop member 73 takes over the function of the upper bumper 39 of the first embodiment. The strut 70 in association with the yieldable member 69 takes over the function of the lip 38 in the first embodiment.

In testing the device of Fig. 3 on a certain vehicle, a lever 3" long (3 inches from the center of the pivot 27 to the center of the bearing 29), placed at an angle of 35° with respect to the horizontal was employed. The results obtained were satisfactory; however, an improvement was noted when the lever was increased to 6" and placed at a 15° angle.

Advantageously our device, when installed in a vehicle employing the three universal joint type of drive shaft assembly, functions in such a manner under driving conditions so as to cause smooth operation in the drive shaft assembly at all times, regardless of engine or braking torque changes or changes in the angles of the universal joints. As pointed out before, there are two resultant forces at the center bearing 29 engendered in the drive shaft assembly with which we are concerned; namely, for a certain torque transmitted to the rear vehicle wheels 15 and for certain angles of the universal joints, a resultant static force which is substantially horizontal and acts from right to left as seen in Fig. 3, when the engine is driving the rear wheels, and a resultant dynamic force which is multi-directional and vibratory, tending to cause vibration in the vehicle. In order to maintain smooth operation in the drive shaft assembly with changes in torque and universal joint angle, it is necessary to have the dynamic components which are engendered under these conditions substantially cancel each other out and this is brought about by utilizing the resultant static horizontal force to act on the lever 26 so as to move the bearing 29 downwardly as the resultant horizontal static force increases with increased driving torque transmitted to the driving road wheels. The resultant horizontal static force acting on the lever 26 swings the lever counterclockwise as seen in Fig. 3 against the resilient action of the rubber-like stop member 34. This lowering of the bearing 29 with increased drive shaft torque causes the dynamic components to substantially cancel each other out, resulting in a resultant dynamic force of negligible magnitude. The other embodiments of the invention function similarly so that the resultant static horizontal force on the bearing 29 moves the bearing downwardly against the yieldable devices provided.

Specifically, when the vehicle employing this invention is put in operation, sudden acceleration will produce high torque, winding up the springs on the rear axle, thereby changing the angle of the universal joints 23, 24 and 25, and more particularly the angles between the drive shaft sections, which engender resultant static and dynamic forces. The resultant static force acts on the lever 26 causing the lever 26 to swing on the pivot 27 and contact the projection 38 and exert pressure thereon, proportionate to the resultant static force; thus it will be seen that the bearing 29 has been automatically repositioned to meet the changed conditions and thereby set up a condition whereby the dynamic components engendered along the drive shaft assembly tend to cancel each other out and thus leave a negligible resultant dynamic force at the bearing. Conversely, if the brakes are suddenly applied, or the vehicle is driven in reverse, the resultant static force referred to above, would act against the lever 26, moving it to the opposite direction until contact is made with the bumper 39. This re-positioning of the bearing 29 taking place under braking conditions or driving the vehicle in reverse, gives the proper position for having the dynamic components cancel each other out to cause smooth operation of the drive shaft assembly under those conditions. Hence, it can be seen that the bearing is in different locations with respect to different operating conditions and that resultant static forces engendered in the drive shaft assembly automatically produce this positioning. This device is designed and proportioned to meet the requirements of any specific installation so that optimum results are produced by virtue of its automatic functioning.

We wish it to be understood that our invention is not to be limited to the specific constructions and arrangements shown and described, except only insofar as the appended claims may be so limited, as it will be understood to those skilled in the art that changes may be made without departing from the principles of the invention.

What we claim as new and desire to secure by Letters Patent of the United States is:

1. In an automotive vehicle having a frame the combination of, a drive element and a driven element, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said bearing having vibratory forces on it and a resultant horizontal static force on it perpendicular to the plane of said drive shaft sections when there is angularity between said drive shaft sections and said drive element is effective to drive said driven element through said assembly, and an arm fixedly supporting said bearing at one end thereof and connected to said frame to restrict the said bearing to move in an oblique path under the influence of said resultant horizontal force to thereby change the level of the said bearing for reducing said vibratory forces on said bearing.

2. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said bearing having a resultant horizontal force on it when there is angularity in one or more of said universal joints in a vertical plane and said drive element is effective to drive said driven element through said assembly, and an arm fixedly supporting said bearing at one end thereof and connected to the automotive vehicle to restrict the said bearing to move in an oblique path under the influence of said resultant horizontal force to thereby change the level of the said bearing to a degree depending on the magnitude of said horizontal force.

3. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it when there is angularity in one or more of said universal joints in a vertical plane and said drive element is effective to drive said driven element through said assembly, a part fixedly supporting said bearing and connected to the automotive vehicle, said part being constructed so as to restrict the bearing to move in a generally upwardly or downwardly direction under the influence of said resultant static force, and yieldably restraining said bearing from said movement so that the magnitude of the movement depends on the magnitude of the said horizontal force.

4. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said drive element, a bearing supporting one of said sections, said bearing having a resultant horizontal force on it when there is angularity in one or more said universal joints in a vertical plane and said drive element is effective to drive said driven element through said assembly, a lever fixedly supporting said bearing and swingably mounted on a part fixed to the automotive vehicle said lever extending obliquely from its mounting so that said horizontal force acting on said bearing swings said lever and constrains said bearing to move in a fixed downwardly path on an increase in torque transmitted from said drive element through said shaft assembly to said driven element.

5. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections adjacent the universal joint which connects said first and second sections, said bearing having a resultant horizontal force on it when there is angularity in one or more said universal joints in a vertical plane and said drive element is effective to drive said driven element through said assembly, a lever fixedly supporting said bearing and swingably mounted on a part fixed to the automotive vehicle said lever extending obliquely from its mounting so that said horizontal force acting on said bearing swings said lever and moves said bearing downwardly in a fixed path, and a resilient member effective on said lever for yieldably holding said lever against the action of said horizontal force so that the movement of said bearing increases as the horizontal force increases.

6. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections adjacent the universal joint which connects the said first and second sections, said bearing having a resultant horizontal force on it when there is angularity in one or more said universal joints in a vertical plane and said drive element is effective to drive said driven element through said assembly, a lever carrying said bearing swingably mounted on a part fixed to the automotive vehicle and extending obliquely from its mounting so that said horizontal force swings said lever and moves said bearing downwardly on an increase in torque transmitted from said drive element through said drive shaft assembly to said driven element, and a stop of resilient rubber like material resiliently holding said lever from swinging movement from the action of said horizontal force and providing a two stage action for initially yieldably holding said lever with a relatively small force and subsequently holding said lever in a second stage action with a relatively large stopping force.

7. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections, said bearing having a resultant horizontal force in one direction on it when there is angularity in one or more of said universal joints in a vertical plane and said drive element is effective to drive said driven element through said assembly and having a resultant horizontal force in the other direction on it when said driven element is effective to drive said drive element through said assembly, a lever carrying said bearing and swingably mounted on a part fixed to the automotive vehicle and extending obliquely from its mounting so that said horizontal force in said one direction swings said lever and moves said bearing downwardly and said horizontal force in said other direction swings said lever oppositely and moves said bearing upwardly, a stop of resilient rubber-like material resiliently limiting the swinging movement of said lever downwardly from the action of said horizontal force in said one direction and having a two-stage action to initially in a first stage yieldably hold said lever with a relatively small stopping force and subsequently hold said lever in a second stage with a relatively large stopping force, and a second stop of rubber-like material for limiting the swinging movement of said lever upwardly under the influence of the said horizontal force in said other direction.

8. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it when there is angularity in one or more said universal joints in a vertical plane and said drive element is effective to drive said driven element through said assembly, and a flexible lever carrying said bearing and mounted to a part fixed to said automotive vehicle, said lever extending obliquely so that said horizontal force is effective to bend said lever and move said bearing downwardly as the horizontal force increases with increases in torque transmitted through said drive shaft assembly.

9. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it when there is angularity in one or more said universal joints in a vertical plane and said drive element is effective to drive said driven element through said assembly, a flexible lever for mounting said bearing to a part fixed to the automotive vehicle, said lever extending obliquely so that said horizontal force is effective to bend said lever and move said bearing downwardly as the horizontal force increases with increases in torque transmitted through said drive shaft assembly, and a resilient stop member positioned so as to resiliently limit the bending action of said lever under the influence of said horizontal force.

10. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it in one direction when the automotive vehicle is driven forward and a horizontal force on it in the other direction when brakes are applied to the automotive vehicle, a flexible lever carrying said bearing and mounted to a part fixed with respect to the vehicle body, said lever extending obliquely from its mounting so that said horizontal force is effective to bend said lever and move said bearing downwardly as the horizontal force increases with increases in torque transmitted through said drive shaft assembly when the said vehicle is driven forwardly, a resilient stop member positioned so as to resiliently limit the bending action of said lever downwardly under the influence of said horizontal force, and an upper resilient stop member to resiliently limit the bending action of said lever upwardly under the influence of said horizontal force when said horizontal force is effective to move the lever in the opposite direction.

11. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it in one direction when the automotive vehicle is being driven forwardly and a horizontal force on it in the other direction when brakes are applied to the automotive vehicle, a flexible lever carrying said bearing and mounted to a part fixed with respect to the vehicle body, said lever extending obliquely from its mounting so that said horizontal force is effective to bend said lever and move said bearing downwardly as the horizontal force increases with increases in torque transmitted through said drive shaft assembly when the said vehicle is driven forwardly, a stop member positioned so as to limit the bending action of said lever downwardly under the influence of said increases in said torque, and an upper stop member to limit the bending action of said lever upwardly under the influence of said horizontal force when said horizontal force is effective to move in the opposite direction.

12. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it when there is angularity in one or more said universal joints in a vertical plane and said drive element is effective to drive said driven element through said assembly, a lever fixedly supporting said bearing and swingably mounted on a part fixed to the automotive vehicle said lever extending obliquely from its mounting so that said horizontal force acting on said bearing swings said lever and moves said bearing downwardly on an increase in torque transmitted from said drive element through said drive shaft assembly to said driven element, and a coil spring effective for yieldably limiting the downward movement of said lever under the influence of said horizontal force.

13. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections said bearing having a resultant horizontal force on it in one direction when the automotive vehicle is driven forwardly and a horizontal force on it in the other direction when brakes are applied to the automotive vehicle, a lever fixedly supporting said bearing and swingably mounted on a part fixed with respect to said body said lever extending obliquely from its mounting so that said horizontal force in said one direction on said bearing swings said lever and moves said bearing downwardly on an increase of torque transmitted through said drive shaft assembly when the automotive vehicle is driven forwardly, a coil spring effective for yieldably limiting the downward movement of said lever under the influence of said horizontal force, and a stop member effective to limit the movment of the lever in an upward direction when said horizontal force in said other direction on said bearing is effective to move said lever in an upward direction.

14. In an automotive vehicle having a body, a drive element and a driven element, a drive shaft assembly connected between said two elements comprising first and second drive shaft sections, a universal joint between said drive element and said first drive shaft section, a universal joint between said second section and said driven element, a bearing for supporting one of said drive shaft sections, said bearing having a resultant horizontal force on it in one direction when the automotive vehicle is driven forwardly and a horizontal force on it in the other direction when brakes are applied to the automotive vehicle, a lever carrying said bearing swingably mounted on a part fixed with respect to said body and extending obliquely from its mounting so that said horizontal force acting on said bearing swings said lever and moves said bearing downwardly on an increase in torque transmitted through the drive shaft assembly when the automotive vehicle is driven forwardly, a coil spring effective to initially support said lever, a yieldable rubber-like stop member positioned so that it is effective to yieldably support and assist said spring in carrying the additional load that may be placed on said bearing under the influence of the said increase in the said torque, and a stop member effective to limit the upward movement of said lever under the influence of the said horizontal force in the other direction.

15. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it in one direction when the automotive vehicle is driven forwardly and a horizontal force on it in the other direction when brakes are applied to the automotive vehicle, a lever mounted to a part fixed with respect to the vehicle body, said lever extending obliquely so that said horizontal force is effective to move said lever and said bearing downwardly as the horizontal force increases with increases in torque transmitted through said drive shaft assembly when the automotive vehicle is driven forwardly, a spring stop member positioned so as to resiliently support the initial load on said bearing under the influence of said torque, a yieldable stop positioned so as to resiliently cooperate with said spring in supporting an additional load that may be placed on said bearing under the influence of said increases in said torque, and a resilient stop to resiliently limit the upward movement of said bearing under the influence of the horizontal force when the horizontal force is effective in said other direction.

16. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it in one direction when the automotive vehicle is driven forwardly and a horizontal force on it in the other direction when brakes are applied to the automotive vehicle, a lever carrying said bearing and swingably mounted on a part fixed with respect to said body and extending obliquely from its mounting so that said horizontal force swings said lever and moves said bearing downwardly on an increase in torque transmitted through said drive shaft assembly when said automotive vehicle is driven forwardly, a rubber-like member mounted to a part fixed with respect to the said body, and a strut between said lever and said rubber-like member for resiliently limiting downwardly the swing of said lever under the influence of said horizontal force when said automotive vehicle is driven forwardly.

17. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supprting one of said drive shaft sections, said bearing having a resultant horizontal force on it in one direction when the automotive vehicle is driven forwardly and a horizontal force on it in the other direction when brakes are applied to the automotive vehicle, a lever carrying said bearing and swingably mounted on a part fixed with respect to said body and extending obliquely from its mounting so that said horizontal force when the automotive vehicle is driven forwardly swings said lever and moves said bearing downwardly on an increase in torque transmitted through said drive shaft assembly, a spring support means to initially yieldably support said lever, a rubber-like member mounted to a part fixed with respect to the body, and a strut between said lever and said rubber-like member for resiliently limiting downwardly the swing of said lever under the influence of said horizontal force when brakes are applied to said automotive vehicle.

18. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant horizontal force on it in one direction when the automotive vehicle is driven forwardly and a horizontal force on it in the other direction when brakes are applied to the automotive vehicle, a lever carrying said bearing and swingably mounted on a part fixed with respect to the body and extending obliquely from its mounting so that said horizontal force when the automotive vehicle is driven forwardly swings said lever and moves said bearing downwardly on an increase in torque transmitted through said drive shaft assembly, spring support means to initally support said lever against said horizontal force when the automotive vehicle is driven forwardly, a rubber-like member mounted to a part fixed with respect to said body, a strut between said lever and said rubber-like member to resiliently limit the downward swing of said lever under the influence of the said horizontal force, when the automotive vehicle is driven forwardly and an upper yieldable stop member for yieldably limiting upwardly the swing of said lever under the influence of said horizontal force in said other direction.

19. In an automotive vehicle having a body, the combination of a drive shaft assembly comprising two shaft sections connected together by a universal joint with universal joints at opposite ends of said shaft sections connecting the said drive shaft assembly to said automotive vehicle, a bearing mounted on one of said sections, a resultant horizontal force existing on said bearing when there is angularity in one or more said universal joints in a vertical plane and said drive shaft assembly is under torque, said horizontal force being effective to exert itself in either direction depending on the direction of drive, and an arm fixedly supporting said bearing at one end thereof and connected with respect to the automotive vehicle body, said arm being constructed so as to restrict the movement of said bearing to a path either generally upward or downwardly depending on the direction of said horizontal force.

20. In an automotive vehicle having a frame the combination of, a drive element and a driven element, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said last named drive shaft section having a resultant horizontal force on it where there is angularity in one of more of said universal joints in a vertical plane and said drive element is effective to drive said driven element through said assembly, and an arm fixedly supporting said bearing at one end thereof and connected to said frame so as to restrict the said bearing to move in a fixed path in a generally downwardly direction for the purpose of reducing vibratory forces in said shaft assembly.

21. In an automotive vehicle having a body, the combination of a drive element and a driven element, a drive shaft assembly connected between said two elements comprising first and second drive shaft sections, a universal joint between said drive element and said first drive shaft section, a universal joint between said first and second sections, a universal joint between said second sections and said driven element, a bearing for supporting one of said drive shaft sections, said bearing having a first resultant horizontal force on it in one direction when the automotive vehicle is driven forwardly and a second horizontal force on it in the other direction when brakes are applied to said automotive vehicle, a lever carrying said bearing on one end of the lever and pivotally mounted on a part fixed with respect to said body, a counter weight fixed to the other end of said lever opposite said bearing and said lever extending obliquely from its mounting so that said first horizontal force in said one direction on said bearing swings said lever and moves said bearing downwardly and said second horizontal force swings said lever oppositely to move said bearing upwardly, an arm extending from said lever at its end opposite said counter weight, a resilient stop means below said arm and a resilient stop means above said arm, said resilient stop means below said arm being effective to limit the downward swing of said arm under the influence of said first horizontal force and said resilient stop means above said arm being effective to limit the upward movement of said lever under the influence of said second horizontal force.

22. In an automotive vehicle having a frame, the combination of a driving element and a driven element, a drive shaft assembly connected between said two elements and comprising first and second drive shaft sections angularly disposed with respect to each other and lying in a substantially vertical plane, a universal joint between said driving element and said first drive shaft section, a universal joint between said two sections, a universal joint between said second section and said driven element, a bearing for supporting one of said drive shaft sections, said bearing being subjected to vibratory forces and to a resultant generally horizontal static force perpendicular to the plane defined by said drive shaft sections when driving torque is being transmitted therethrough, and a support for said bearing comprising an arm connected with respect to said frame, said bearing being fixedly supported by said arm at one end thereof, said arm being adapted to permit movement of said bearing under the influence of said horizontal force, said movement of said bearing being restricted to a path in a generally upwardly or downwardly direction for thereby reducing said vibratory forces on said bearing.

23. In an automotive vehicle having a frame, the combination of a driving element and a driven element, a drive shaft assembly connected between said two elements and comprising first and second drive shaft sections angularly disposed with respect to each other and lying in a substantially vertical plane, a universal joint between said driving element and said first drive shaft section, a universal joint between said two sections, a universal joint between said second section and said driven element, a bearing for supporting one of said drive shaft sections, said bearing being subjected to vibratory forces and to a resultant generally horizontal static force perpendicular to the plane defined by said drive shaft sections when driving torque is being transmitted therethrough, and a part connected with respect to said frame and fixedly supporting said bearing and permitting movement of said bearing under the influence of said horizontal force, said part being so constructed so as to restrict said movement of said bearing to a path in a generally upwardly or downwardly direction for thereby reducing said vibratory force on said bearing.

References Cited in the file of this patent

UNITED STATES PATENTS

| | | |
|---|---|---|
| 1,324,379 | Bicknell et al. | Dec. 9, 1919 |
| 2,507,406 | Hardy | May 9, 1950 |
| 2,560,759 | Evernden | July 17, 1951 |
| 2,674,330 | Feil | Apr. 6, 1954 |

UNITED STATES PATENT OFFICE

CERTIFICATE OF CORRECTION

Patent No. 2,953,213                          September 20, 1960

Robert W. Halberg et al.

It is hereby certified that error appears in the printed specification of the above numbered patent requiring correction and that the said Letters Patent should read as corrected below.

Column 2, line 24, for "vehcile" read -- vehicle --; line 31, after "bearing", and before the period, insert -- to minimize the resultant dynamic force at the bearing --; column 11, line 51, for "movment" read -- movement --; line 59, after "section," insert -- a universal joint between said first and second sections, --.

Signed and sealed this 11th day of April 1961.

(SEAL)
Attest:
ERNEST W. SWIDER                          ARTHUR W. CROCKER
                                                  Acting Commissioner of Patents Attesting Officer